US006799056B2

(12) United States Patent  
Curley et al.

(10) Patent No.: US 6,799,056 B2
(45) Date of Patent: Sep. 28, 2004

(54) COMPUTER SYSTEM INCLUDING MULTI-CHANNEL WIRELESS COMMUNICATION LINK TO A REMOTE STATION

(76) Inventors: Joseph Curley, 9929 Jasmine Creek, Austin, TX (US) 78726; Eric Swartzendruber, 3009 Adam Cove, Round Rock, TX (US) 78681

(*) Notice: Subject to any disclaimer, the term of this patent is extended or adjusted under 35 U.S.C. 154(b) by 601 days.

(21) Appl. No.: 09/774,838

(22) Filed: Jan. 31, 2001

(65) Prior Publication Data

US 2002/0102979 A1 Aug. 1, 2002

(51) Int. Cl.[7] .................................................. H04B 1/38
(52) U.S. Cl. .................. 455/556.1; 455/557; 455/41.3; 375/222
(58) Field of Search ............................ 455/556.1, 556.2, 455/557, 450, 452.1, 41.2, 41.3, 62, 434; 375/222; 370/338, 329

(56) References Cited

U.S. PATENT DOCUMENTS 4,872,205 A 10/1989 Smith
4,894,856 A 1/1990 Nakanishi et al.
6,026,119 A * 2/2000 Funk et al. .................. 375/222
6,259,726 B1 * 7/2001 Saadeh et al. .............. 375/222

OTHER PUBLICATIONS

Meyer, Frank, *Sonic Box Let's You Go Remote With Web Radio*, Sep. 15, 2000.

* cited by examiner

*Primary Examiner*—Lee Nguyen

(57) ABSTRACT

A computer system which is capable of transmitting information content through walls and other barriers to a remote station such as a home entertainment system. The system tests a plurality of radio frequency channels to locate a channel that is not in use. Channels that are in already in use are rejected to avoid interference with existing services. Once an unused channel is located, the computer system displays indicia of that channel to the user and transmits information content on the unused channel. The remote station receives the information content. In one embodiment, the remote station is a home entertainment system with audio amplifiers and speakers substantially larger and more powerful than those typically associated with computer systems such as personal and other computers. In this manner the audio and/or video qualities of the computer system are substantially enhanced by transmitting content to the remote system for presentation in an acoustically and/or visually enhanced environment.

18 Claims, 5 Drawing Sheets

COMPUTER SYSTEM INCLUDING MULTI-CHANNEL WIRELESS COMMUNICATION LINK TO A REMOTE STATION

BACKGROUND

The disclosure herein relates generally to computer systems and more particularly to a computer system capable of communicating information signals to a remote location.

Many modern households include one or more personal computers. These personal computers are generally microprocessor-based, programmable electronic devices that store, process and retrieve data. The audio and graphics qualities of such computers have advanced substantially over time. However, these qualities can often be still further enhanced if the computer is connected to a home entertainment system. This is so because many home entertainment systems employ advanced speaker systems and displays that are generally substantially larger than those typically used with a personal computer. Many home entertainment systems include an audio video (A/V) receiver that provides AM, FM and video signal processing and audio amplification. These systems also often include a powerful multi-channel audio amplifier, multiple high quality audio speakers, a large display, a CD player, a digital versatile disk (DVD) player, and a videocassette recorder (VCR). Connecting a personal computer to such a home entertainment system can substantially enhance the computer user's experience.

Home entertainment systems and computers are often not located in close proximity to one another. The computer may be in one room and the home entertainment system may be in another room some distance away. This immediately presents a significant challenge to the user who desires to connect the computer to the home entertainment system to take advantage of the system's superior acoustic and video qualities. Running wires through existing walls and ceilings to connect a computer to a remote entertainment system can be difficult, time-consuming and expensive.

SUMMARY

The various embodiments of the present disclosure provide a computer system that is capable of wireless communication with a remote entertainment system; provide a computer system that communicates on a selected radio frequency with a remote entertainment system in a manner that does not cause interference to other services; and provide a computer system that avoids radio frequency (RF) channels already in use when selecting a channel for wireless RF communication with a remote entertainment system.

In accordance with one embodiment, a computer system is provided for communicating information content to a remote station. The computer system includes an RF processing section coupled to a digital processing section. The RF processing section includes a programmable channel receiver for receiving a plurality of radio frequency channels. The RF processing section further includes a programmable channel transmitter for transmitting information content on a selected channel. The digital processing section includes an information processor and a memory coupled to the information processor. The digital processing section further includes an information content source, coupled to the information processor, for supplying information content. The information processor instructs the programmable channel receiver to cycle through the plurality of radio frequency channels until an unused channel is found. Once an unused channel is found, the information processor instructs the programmable channel transmitter to transmit the information content on the unused channel which becomes the selected channel.

In accordance with another embodiment, a computer system is provided for communicating information content to a remote station. The computer system includes a digital processing section having an information processor and a memory coupled to the information processor. The digital processing section also includes an information content source, coupled to the information processor, for supplying information content. The computer system further includes an RF processing section coupled to the digital processing section. The RF processing section includes a channel programmable receiver for receiving a plurality of radio frequency channels and testing the plurality of radio frequency channels to find an unused channel. The RF processing section further includes a channel programmable transmitter, coupled to the information content source, for transmitting the information content on the unused channel.

BRIEF DESCRIPTION OF THE DRAWINGS

The features of the described embodiments believed to be novel are specifically set forth in the appended claims. However, embodiments relating to both structure and method of operation may best be understood by referring to the following description and accompanying drawings.

DETAILED DESCRIPTION

Figure 1:
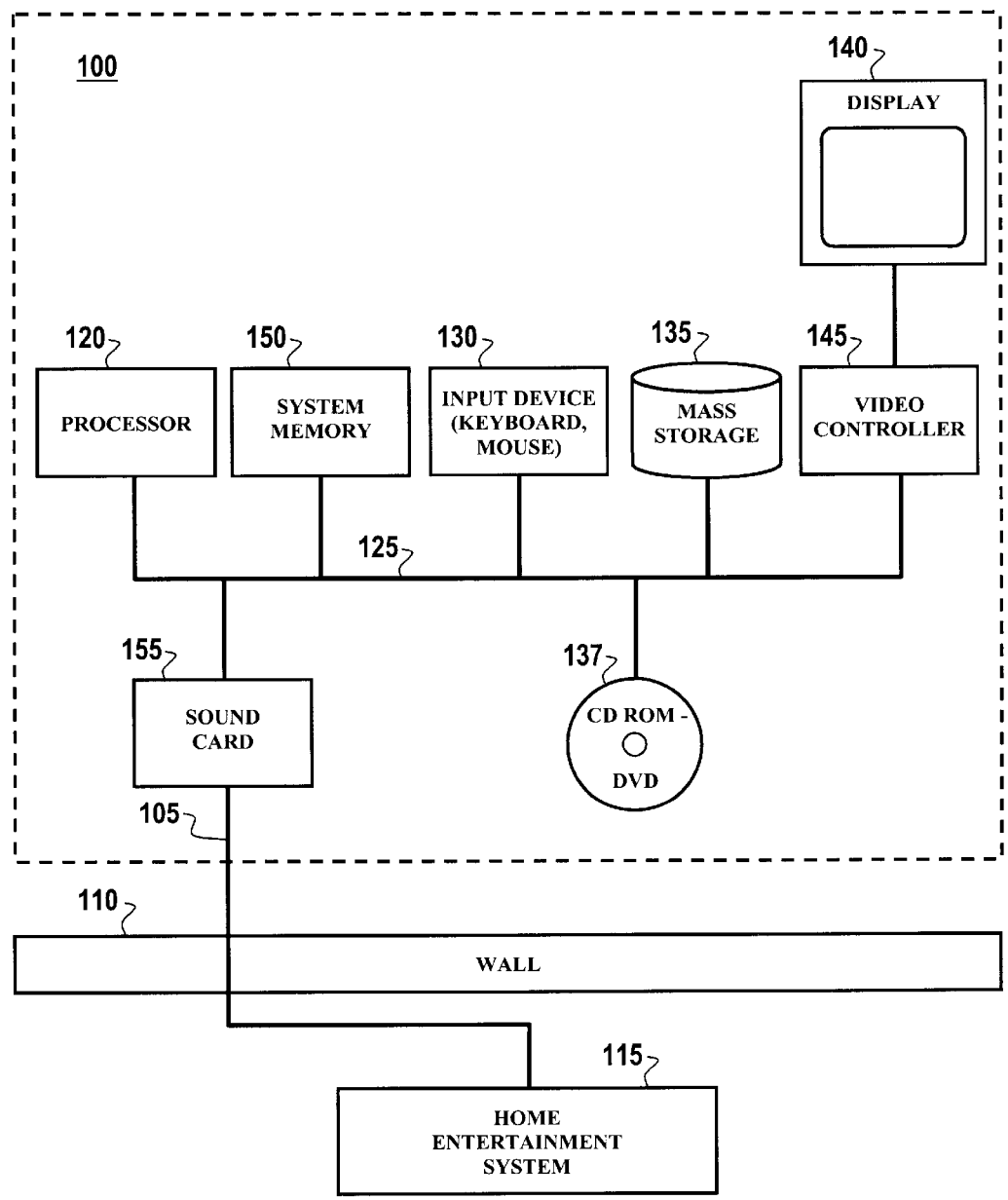
FIG. 1, labeled PRIOR ART, is a block diagram illustrating a conventional computer system employing a wire connection through a wall to a remote home entertainment system.

Referring to FIG. 1, a block diagram shows a conventional computer 100 connected by wire 105 through one or more walls 110 to a remote home entertainment system 115. Computer 100 includes a processor 120 coupled to a bus 125. For examples, a Pentium series microprocessor manufactured by Intel Corporation, a Power PC series microprocessor by Motorola or other processor can be used as processor 120. Bus 125 servers as a connection between processor 120 and other components of computer 100. Microsoft Windows, Apple Macintosh OS, Linux or other operating systems can be employed as the operating system for computer 100. An input device 130 is coupled to processor 120 to provide input to processor 120. Examples of input devices include keyboards, touchscreens, microphones, and pointing devices such as a mouse, trackball or trackpad. The operating system, programs and data are stored in a mass storage device 135, which is coupled to processor 120 via bus 125. Mass storage device 135 includes such devices as hard disks, optical disks, magneto-optical disks, floppy drives, CD-ROM drives, DVD drives and the like. An illustrative CD ROM/DVD drive 137 is shown coupled to bus 125 in FIG. 1. Computer 100 further includes a display 140 that is coupled to processor 120 by a video graphics controller 145. A system memory 150 is coupled to processor 120 to provide the processor with fast storage to facilitate execution of computer programs. It should be understood that other busses and intermediate circuits can be employed between the components described above and processor 120 to facilitate interconnection between the components and the processor. Bridge chips (not shown) are often used to couple the processor to one or more conventional buses such as the PCI (Peripheral Component Interconnect) bus, the USB bus (Universal Serial Bus), the PCMCIA/PC Card bus, the ISA (Industry Standard Architecture) bus, and the IEEE 1394 bus, for example. These busses facilitate connection of the computer to interface cards and peripherals. Microprocessor 120 is capable of executing application programs stored in mass storage 135.

A sound card 155 is coupled to bus 125 to enable connection of computer 100 to external audio devices, such as local or remote audio speakers. Sound card 155 is connected via conductive wires 105 to a home entertainment system 115 in a location remote from computer system 100. Considerable effort is required to drill holes in one or more walls 110 to permit sound card 155 to be connected to remote home entertainment system 115. However, this effort is rewarded by the increased audio quality experienced by the listener. The listener experiences enhanced sonic quality because the amplifiers and speakers associated with most home entertainment systems are typically larger and more powerful than those generally employed by conventional computer systems. Unfortunately, drilling holes through walls or other barriers to establish a hard wire connection between the computer and the entertainment system is frequently not a reasonable option.

Figure 2A:
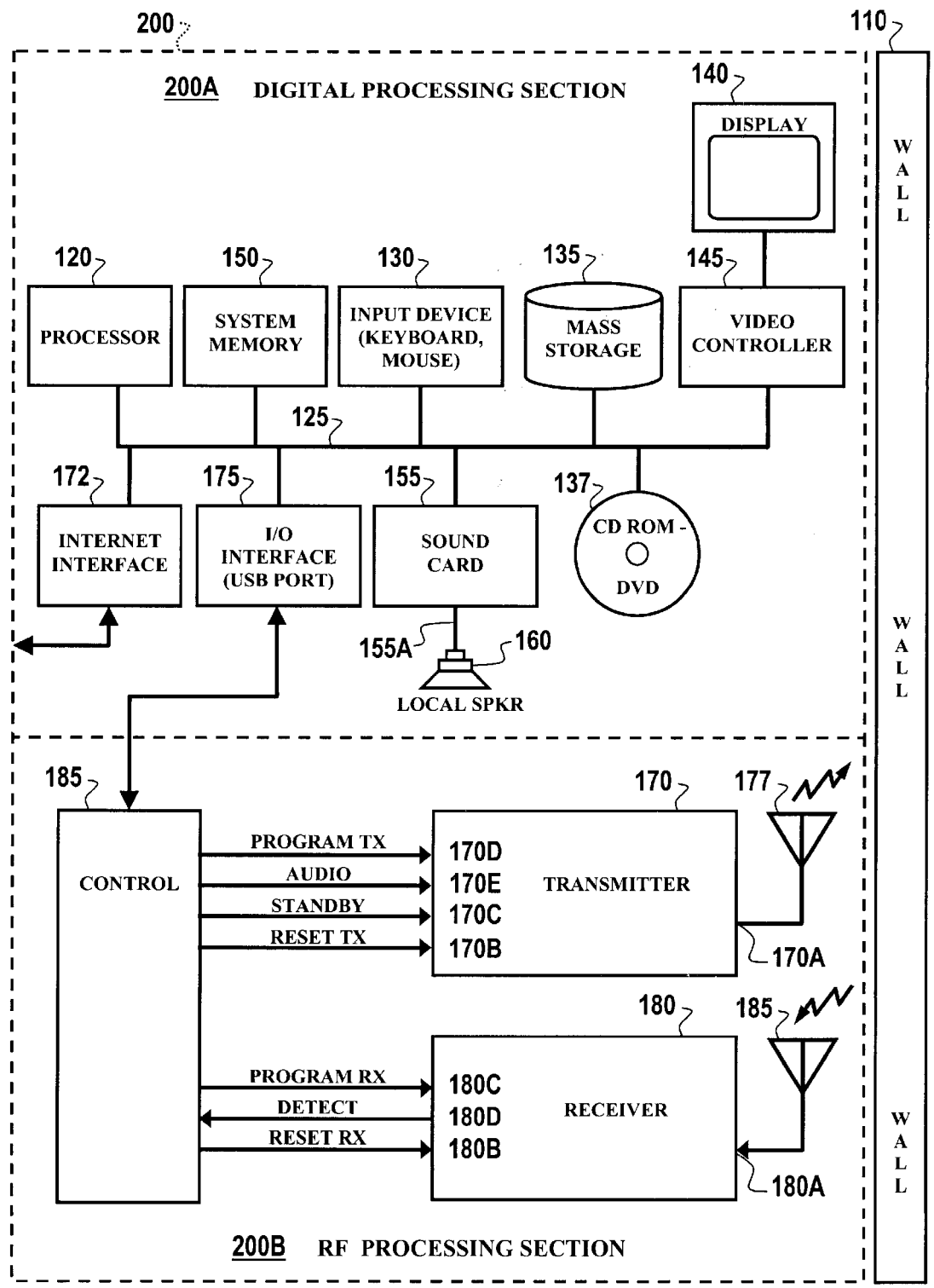
FIG. 2A is a schematic block diagram of one embodiment of the disclosed computer system.

FIG. 2A shows a computer system 200 for wirelessly transmitting audio or audio/video information signals to a remote station such as a remote home entertainment system, for example. In this particular embodiment, the system performs this transmission by modulating the audio information or content on a radio frequency carrier signal. Frequency modulation, amplitude modulation and phase modulation are examples of modulation techniques that may be employed. System 200 is capable of transmitting on a plurality of different radio frequency channels. Prior to transmission, the system checks a candidate radio frequency channel to assure that the channel is clear. In other words, computer system 200 checks to see if the candidate channel is unused or not busy. If the radio frequency channel is clear, then transmission commences. However, if system 200 finds that the candidate radio frequency channel is not clear, then the system moves to a different candidate frequency channel and repeats the test. New candidate channels are so tested until a clear radio frequency channel is located. In this manner, interference to services already occupying candidate radio frequency channels is avoided or substantially reduced.

Computer system 200 and its operation are now described in more detail. System 200 of FIG. 2A contains some elements in common with computer 100 of FIG. 1 with like numbers indicating like elements. System 200 includes a digital processing section 200A and a radio frequency (RF) processing section 200B as illustrated. It is noted that the RF processing section can be integrated within the computer system. For example, the RF processing section can be situated within the same chassis or enclosure as the digital processing section. Alternatively, the RF processing section can be a separate module or standalone device that is coupled to the digital processing section.

An embodiment wherein RF processing section 200B is integrated with respect to digital processing section 200A is now discussed with reference to FIG. 2A. A sound card 155 is coupled to bus 125 of system 200 to provide audio to a local speaker system 160. Sound card 155 may have one (monaural), two (stereo), or more channel audio outputs indicated collectively as 155A. An example of one sound card that can be employed as sound card 155 is the SoundBlaster 64 v PCI card manufactured by Creative Technology Ltd. Audio content for sound card 155 can be retrieved from mass storage 135, CD ROM/DVD 137, from the Internet interface 172 or may be generated by computer system 200 itself. Devices that can be employed as Internet interface 172 include cable modems, DSL modems, ISDN modems, as well as dial-up and wireless modems, for example. The internet interface 172 advantageously provides system 200 with audio and video content beyond that generated by system 200 or stored in system 200 at mass storage 135 or CD/DVD drive 137.

Digital processing section 200A includes an I/O interface 175 coupled between bus 125 and RF processing section 200B to provide audio or audio/video content to RF processing section 200B. RF processing section 200B is given the task of transmitting this content to a remote entertainment system. A data stream including audio or audio/video is communicated to RF Processing section 200B via I/O interface 175. The data stream can include analog information, digital information or a combination of analog and digital information. Control commands from digital processing section 200 are also conveyed across interface 175 to enable digital processing section 200A to control the operation of RF processing section 200B in this embodiment. Responsive status information such as candidate frequency availability is communicated from RF processing section 200B back to digital processing section 200A via I/O interface 175. One type of interface that can be employed as interface 175 is a Universal Serial Bus (USB) interface. Other interfaces such as serial, parallel and IEEE 1394 could be employed as well.

RF processing section 200B includes a transmitter 170, a receiver 180 and a control circuit 185 through which digital processing section 200A controls the operation of transmitter 170 and receiver 180. A digital audio data stream (content) is fed through I/O interface 175 to control circuit 185 which supplies a corresponding analog audio signal to transmitter 170 for transmission. This analog signal is designated AUDIO although it may contain video content as well. An embodiment is also contemplated wherein this content signal provided to transmitter 170 is digital audio or digital audio/video. Control circuit 185 includes a RESET TX port that is coupled to transmitter input 170B to reset the transmitter on command from digital processing section 200A. The operating frequency of transmitter 170 is programmable. Control circuit 185 includes a PROGRAM TX port that is coupled to transmitter input 170D to set the operating frequency of transmitter 170. A PROGRAM TX signal is generated by control circuit 185 under program control of digital processing section 200A to set the operating frequency of transmitter 170. In this manner, a control program executed in digital processing section 200A sets the frequency of transmitter 170.

Control circuit 185 further includes a RESET RX port that is coupled to receiver input 180B to enable the control program to reset receiver 180. Control circuit 185 also includes a PROGRAM RX port that is coupled to receiver input 180C to enable the control program to set the operating frequency of receiver 180. The operating frequency of receiver 180 is programmable and is referred to as the candidate operating frequency while such frequencies are being tested for usability. Computer system 200 tests candidate frequencies until an unused frequency is found which is available for use by system 200 to transmit content to a remote entertainment system. Receiver input 180A is coupled to an antenna 185 and transmitter output 170A is coupled to an antenna 177. In this particular embodiment, receiver 180 is programmable to receive all channels within the standard broadcast FM band, namely 88 MHz to 108 MHz. Transmitter 170 is programmable to transmit on any channel within the 88 MHz to 108 MHz FM band. Of course, other bands and channels can be used as desired according to the particular application.

In this embodiment a control program is stored in mass storage 135 to govern the selection of a radio frequency channel for system 200. Receiver 180 and transmitter 170 are thus said to be under program control as will be discussed in more detail subsequently. When system 200 is powered up, processor 120 is initialized to commence system operation. After the operating system loads, the radio frequency control program stored in mass storage 135 is loaded and begins to control the operation of receiver 180 and transmitter 170. Receiver 180 and transmitter 170 are both reset. More particularly, receiver 180 is reset when control circuit 185 provides a RESET RX signal to the reset input 180B of receiver 180. Transmitter 170 is reset when control circuit 185 provides a RESET TX signal to the reset input 170B of transmitter 170. The control program executed by digital processing section 200A then instructs control circuit 185 to generate a PROGRAM RX signal which programs receiver 180 to listen to a first candidate frequency, for example 88.1 MHz. The PROGRAM RX signal is provided to input 180C of receiver 180. The first candidate frequency is then tested to see if it is already in use; i.e. a test is conducted to determine if a signal is already present at the candidate frequency.

To facilitate this signal presence test, a Motorola MC13156 FM demodulator is employed in receiver 180 in this particular embodiment. This demodulator includes a DETECT pin 180D which changes state when a signal is detected at the programmed frequency of operation. When receiver 180 receives a signal at the frequency set by the PROGRAM RX signal, the DETECT signal at output 180D goes high. However, if the frequency were unused, i.e. the frequency is not occupied by a significant signal, then the DETECT signal remains low. The DETECT signal is fed back to digital processing section 200A via control circuit 185 and USB interface 175 to provide information to processor 120 indicating whether or not the selected radio frequency is in use or busy. In this example, receiver 180 detects a significant signal at the first candidate radio frequency and thus the frequency is found to be already in use. Under these conditions transmission is not desired. Digital processing section 200A instructs control circuit 185 to keep the STANDBY signal at transmitter input 170C in the inactive state to maintain transmitter 170 in standby mode. The AUDIO signal provided to transmitter input 170E is thus not transmitted. Digital processing section 200A now operates under program control to cause control circuit 185 to change the PROGRAM RX signal provided to receiver input 180C signal to correspond to a second candidate frequency, 88.3 MHz. In short, we increment to a second candidate frequency and test again to determine if the frequency is in use.

In this example, it is assumed that the second candidate frequency is not in use. Thus, receiver 180 receives no significant signal when it tests the second candidate frequency and the DETECT signal goes low. In response, digital processing section 200A operates under program control to cause control circuit 185 to shift the transmit frequency to the second candidate frequency, 88.3 MHz, which was found not to be in use. More particularly, control circuit 185 sends transmitter input 170D a PROGRAM TX signal corresponding to the second candidate frequency. Under program control the control circuit 185 now changes the STANDBY signal provided to transmitter input 170C to an active state causing transmission to commence. The audio content provided to transmitter input 170E is thus transmitted at the second candidate frequency, 88.3 MHz because it was found to be clear.

If the second candidate radio frequency or channel had been busy, digital processing section 200A would continue the search for an unused RF channel until an unused channel was found. Because the second candidate frequency has been selected for transmission, the second candidate frequency is now displayed on display 140 to inform the user as to which frequency the remote station 300 of FIG. 2B should be tuned to receive the content transmission.

Figure 2B:
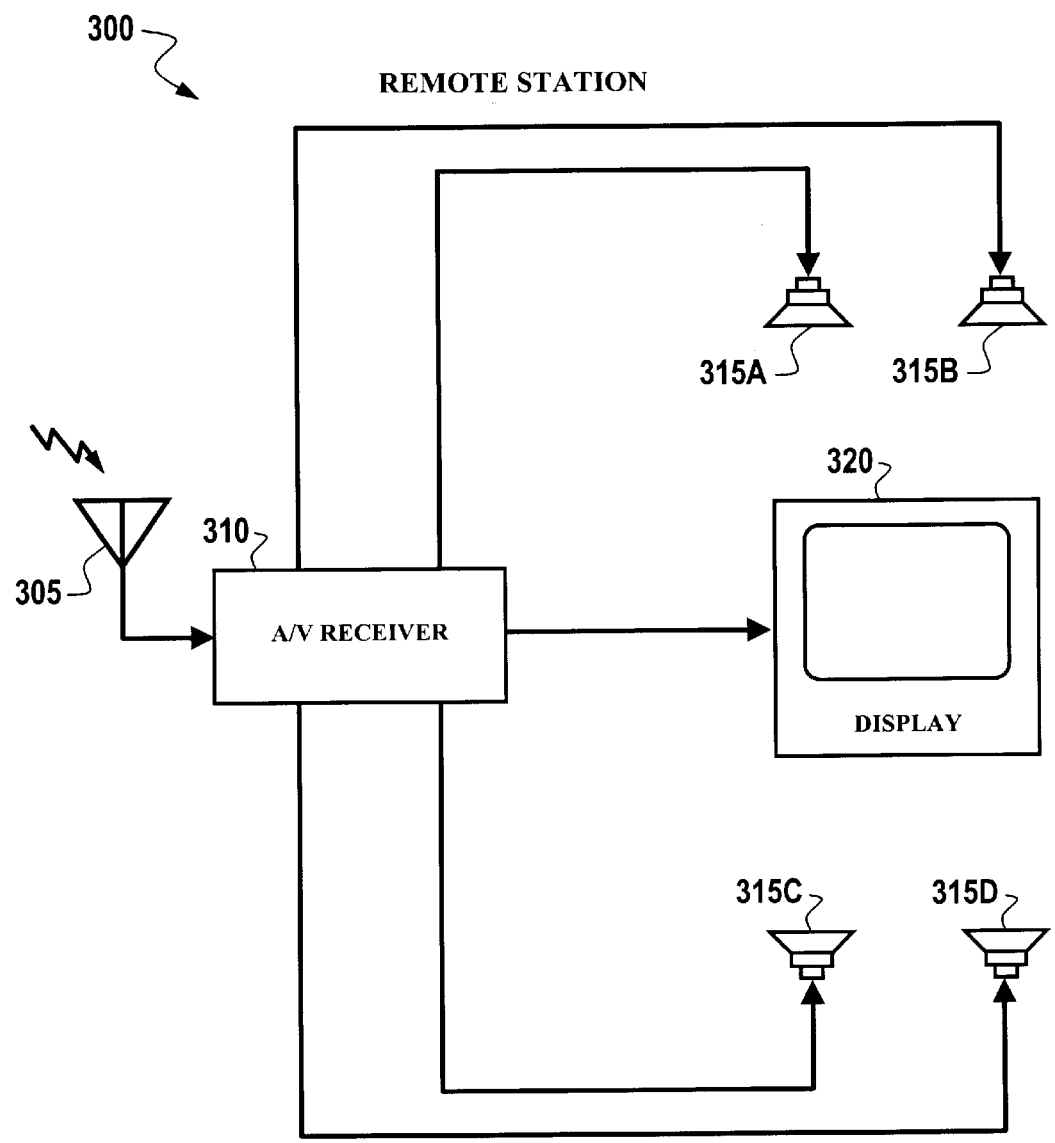
FIG. 2B is a schematic block diagram of a remote entertainment system capable of receiving information signals from the computer system of FIG. 2A.

As illustrated in FIG. 2B, one version of remote station 300 includes a receiving antenna 305 that is coupled to an input of audio/video (A/V) receiver 310. Front left speaker 315A, front right speaker 315B, rear left speaker 315C and right rear speaker 315D are coupled to respective audio outputs of AN receiver 310. While this particular version includes four audio outputs and speakers, a lesser or greater number of speakers can be employed according to the particular application. A/V receiver 310 includes an FM tuner. As mentioned earlier, when system 200 selects a clear radio frequency channel on which to transmit, the frequency or other identifying indicia of this channel (e.g. a channel number) is displayed on display 140. In this manner, the user is informed as to which frequency the FM tuner in A/V receiver 310 should be tuned. The audio content which is modulated on the transmitted RF signal is demodulated by receiver 310, amplified by an audio amplifier in receiver 310 and fed to speakers 315A–315D. Content from computer system 200 is thus wirelessly transmitted through one or more walls 110 or other barriers to remote station 300. Remote station 300 is also referenced herein as an entertainment system, specifically a remote entertainment system. Entertainment system 300 is remote from computer system 200 in that it is separated from computer system 200 by some distance that is traversed by the wireless transmissions described herein.

It should be noted that in actual practice antennas 177 and 185 can be implemented as a single antenna by providing receiver 180 and transmitter 170 with appropriate transmit-receive (TR) switching circuitry.

Figure 3:
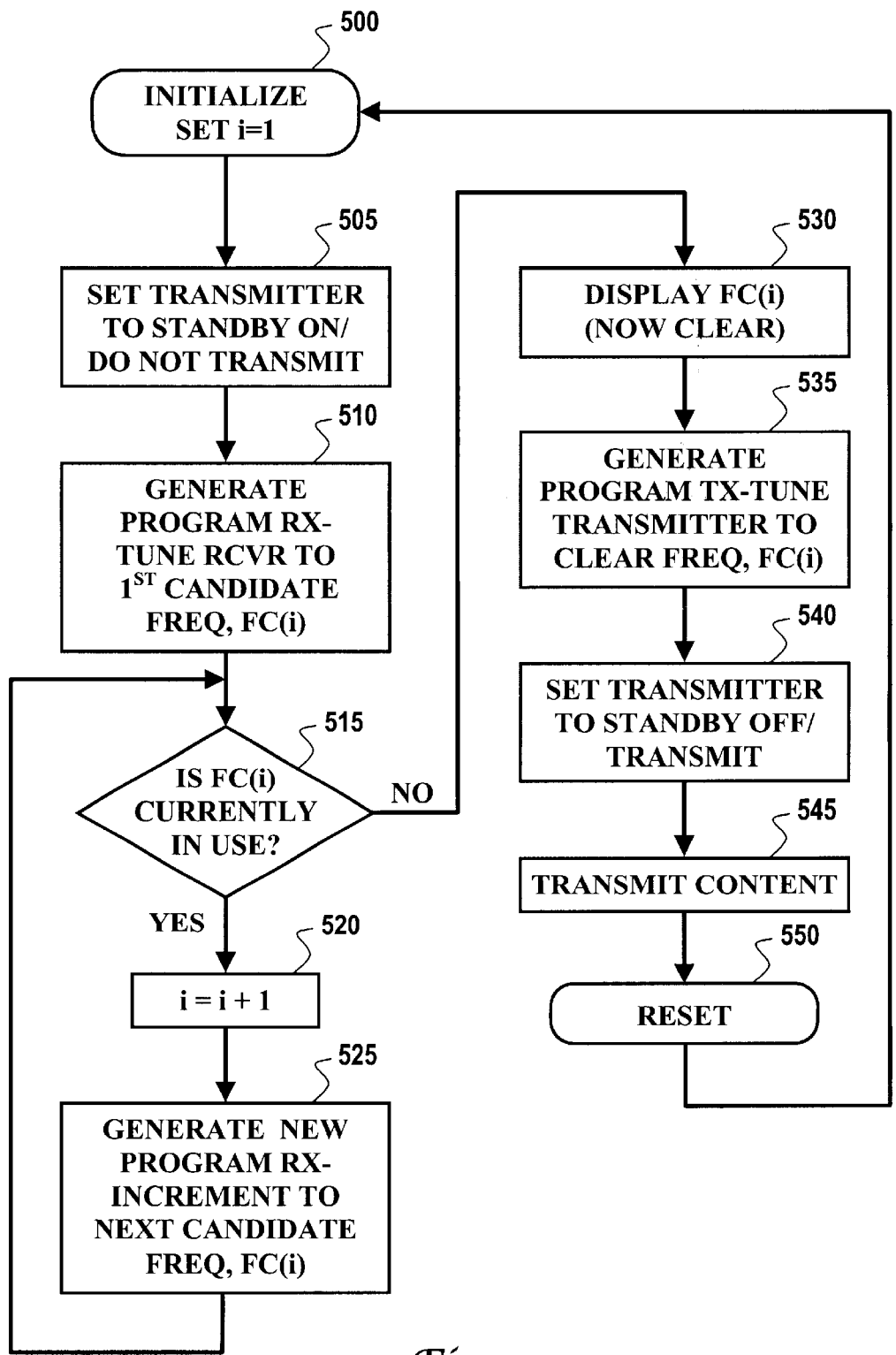
FIG. 3 is a flow chart illustrating the process flow implemented by the computer system of FIG. 2A.

FIG. 3 is a flowchart describing the operation of the aforementioned control software or control program that is stored in mass storage 135 to provide program control for computer system 200. The control software, when executed by processor 120, controls the operation of system 200 of FIG. 2A as it seeks out a clear radio frequency channel on which to transmit content to remote station 300 of FIG. 2B. Process flow is now described with reference to FIG. 3. The system is initialized as per block 500 and a counter "i" is set to an initial value of 1. Digital processing section 200A instructs control circuit 185 to generate a STANDYBY signal with a low state to set transmitter 170 to the "standby" state as per block 505. Then, as per block 510, digital processing section 200A then instructs control circuit 185 to generate a PROGRAM RX signal which causes programmable receiver 180 to be tuned to the first candidate frequency channel, FC(1) wherein i=1. In one example, the frequency of channel 1, namely FC (1), is 88.1 MHz. A test is now conducted as per decision block 515 to determine if the first candidate frequency channel FC(1) is already in use. If receiver 180 finds a signal on the first candidate frequency FC(1), then the DETECT signal returned to digital processing section 200A via control circuit 185 exhibits a value indicating that the frequency is in use. In contrast, if receiver 180 finds no substantial signal at the first candidate frequency FC(1), then a DETECT signal indicating a free channel is returned to digital processing section 200A.

For example purposes however, assume that a signal is received at the first candidate frequency FC(1). Digital processing section 200A tests the DETECT signal and determines that the first candidate frequency FC(1) is indeed busy as per decision block 515. The counter "i" is now incremented by 1 as per block 520. Digital processing section 200A changes the candidate frequency FC (i) to the next candidate frequency, for example, 88.3 MHz as per block 525. To perform this operation, digital processing section 200A instructs control circuit 185 to change the PROGRAM RX signal to a value corresponding to the next candidate frequency, Fc(1). In response, receiver 180 is then tuned to a channel corresponding to this new candidate frequency.

A test is now conducted at decision block 515 to determine if the new candidate frequency is in use. In this example, it is determined that the new candidate frequency is not in use, but rather is available for transmission. Process flow now continues to block 530 at which this new candidate frequency, Fc(1) (for example, 88.3 MHz) is displayed to the user on display 140. In this manner, the user knows to which frequency the remote station 300 should be tuned to receive content from system 200. As per block 535, digital processing section 200A instructs control circuit 185 to generate a PROGRAM TX signal to tune transmitter 170 to the candidate frequency, Fc(1), which was found to be clear for use. Digital processing section 200A then instructs control circuit 185 to generate a STANDBY signal with an active state to turn on transmitter 170 at block 540 and commence transmission of content at block 545. If the user desires to reset the system, the user initiates a reset by an appropriate mouse click selection on display 140 as indicated at block 550. Process flow then goes back to block 500 and the system is re-initialized.

Figure 4:
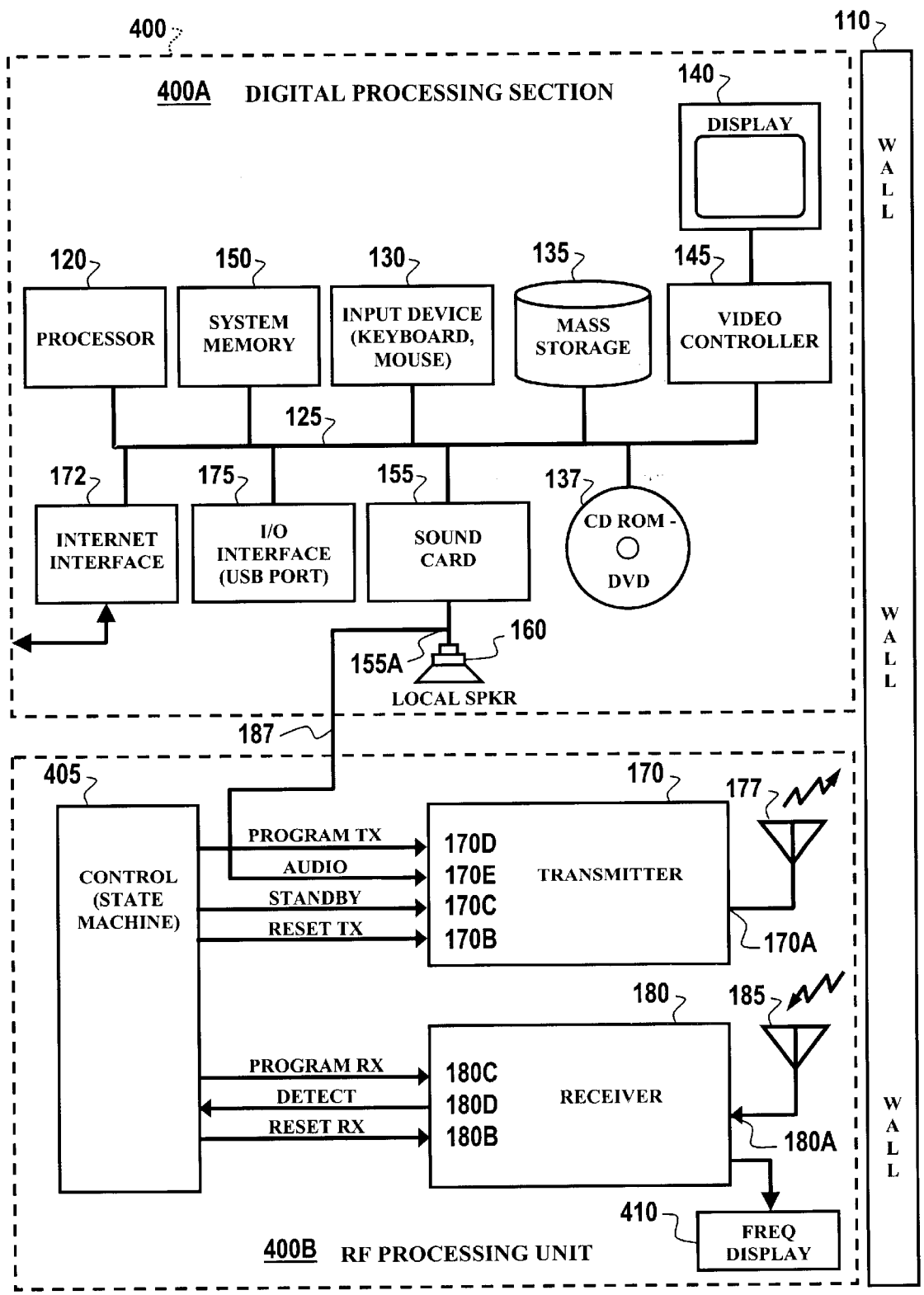
FIG. 4 is a schematic block diagram of another embodiment of the disclosed computer system.

FIG. 4 shows another embodiment of the computer system as system 400. Like system 200 discussed earlier, system 400 includes both a digital processing portion and an RF processing portion. However, in this particular embodiment, RF processing unit 400B is a unit that is physically separate from digital processing section 400A. RF processing unit 400B and digital processing section 400A are not integrated in the same chassis, although such integration is contemplated in yet another embodiment.

It will be noted that digital processing section 400A and RF processing unit 400B have similarities to sections 200A and 200B, respectively of FIG. 2A, with like numbers indicating like elements. However, in system 400 an analog audio line 187 connects sound card output 155A to AUDIO transmitter input 170E. In this manner, content is provided to transmitter 170 for transmission to a remote station or entertainment system. It will be recalled that in system 200 of FIG. 2A, digital processing section 200A controlled frequency selection and channel testing. In contrast, in the system 400 embodiment of FIG. 4, RF processing unit 400B controls the frequency selection and testing.

RF processing unit 400B includes a control circuit 405 having a state machine therein which controls the operation of RF processing unit 400B. Control circuit 405 and the state machine therein implement substantially the same control operations and functions as described earlier in the flow chart of FIG. 3. The difference is that RF processing unit 400B carries out these control operations and functions of the FIG. 3 flowchart in a substantially standalone manner independent of digital processing section 400A. More particularly, control circuit 405 and its state machine generate the PROGRAM TX, STANDBY, RESET TX, PROGRAM RX, AND RESET RX signals that control candidate frequency selection and testing. Control circuit 405 and its state machine implement substantially the same steps called out in the flowchart FIG. 3. In this manner each candidate frequency is programmed into receiver 170 and tested to determine if it is in use before transmission of content is permitted.

In more detail, operation commences after system initialization with control circuit 405 generating a STANDBY signal which puts transmitter 170 in a standby state until a clear frequency channel is found. Control circuit 405 then generates an appropriate PROGRAM RX signal to set receiver 180 to a first candidate frequency. For discussion purposes it is assumed that the first candidate frequency is already in use by another service. Consequently, a signal is detected on the first candidate frequency and the DETECT signal goes high. The state machine recognizes the high DETECT signal and causes the control circuit to change the PROGRAM RX signal to a value which instructs receiver 180 to move to a second candidate frequency. To further our discussion it is assumed that the second candidate frequency is not in use. Because no signal is detected by the receiver, the DETECT signal goes low. The state machine responds to the DETECT signal going low and control circuit 405 generates a PROGRAM TX signal which instructs transmitter 170 to tune to the second candidate frequency in preparation for transmitting the content. Control circuit 405 then changes the state of the STANDBY signal to the active state to turn on transmitter 170 to commence transmission of the content. A display 410 is coupled to receiver 180 to display the frequency of the transmitted signal. In this manner, the user is informed of the frequency channel that is determined to be clear. The user then tunes the receiver of the remote entertainment system to the clear channel to receive the transmitted content.

From the above discussion it should be understood that the function of moving from candidate frequency channel to candidate frequency channel and testing each channel to determine if it is already in use can be controlled by software, namely the control program already discussed with respect to system 200 of FIG. 2. Alternatively, this functionality can be implemented by equivalent hardware such as that of RF processing unit 400B in system 400 of FIG. 4.

The foregoing has described a computer system that is capable of wireless communication with a remote entertainment system. Advantageously, the computer system communicates on a selected radio frequency channel with a remote entertainment system in a manner that does not cause interference to other services. The problem of connecting a computer to a remote entertainment system when there are one or more barriers between the computer and the entertainment system is solved by the disclosed computer system. The computer system also solves the problem of connecting a computer system to a remote entertainment system in the same room when it is not convenient or desirable to connect the computer system to the entertainment system with conventional wires.

While various embodiments have been described, it will be understood that these embodiments are illustrative and that many variations, modifications, additions and improvements of the embodiments described are possible. For example, it should be understood that the disclosed computer system is not limited to operating on the particular frequency band discussed in the examples above. Rather, other bands of higher or lower frequency can be employed as well. Moreover, the computer system is not limited to FM, but can be employed with other modulation methods such as AM, phase modulation, single sideband and double sideband, for example. While the particular embodiments discussed provide for transmission of audio content, it will be appreciated that the disclosed techniques can also be used to transmit video on an unused candidate channel or to transmit a combination of audio and video on an unused channel. Additional bandwidth may be required for channels in such applications. Those skilled in the art will readily implement the steps necessary to provide the structures and methods disclosed herein, and will understand that the process parameters, materials, and dimensions are given by way of example only and can be varied to achieve the desired structure as well as modifications which are within the scope of the embodiments disclosed herein. Variations and modifications of the embodiments may be made based on the description set forth herein, without departing from the scope and spirit of the embodiments as set forth in the following claims.

What is claimed is:

1. A computer system for communicating information content to a remote station, the computer system comprising:
   an RF processing section coupled to a digital processing section;
   the RF processing section including:
      a programmable channel receiver for receiving a plurality of radio frequency channels;
      a programmable channel transmitter for transmitting information content on a selected channel; and
      a control means for enabling the digital processing section to reset the transmitter and receiver and for setting transmitting and receiving operating frequencies;
   the digital processing section including:
      an information processor;
      a memory coupled to the information processor;
      an information content source, coupled to the information processor, for supplying information content; and
      the information processor instructing the programmable channel receiver to cycle through the plurality of radio frequency channels until an unused channel is found, the information processor then instructing the programmable channel transmitter to transmit the information content on the unused channel which becomes the selected channel.

2. The computer system of claim 1 wherein the digital processing section and the RF processing section share a common chassis.

3. The computer system of claim 1 wherein the RF processing section is configured as a standalone unit with respect to the digital processing section.

4. The computer system of claim 1 further comprising a USB connection between the digital processing section and the RF processing section.

5. The computer system of claim 1 wherein the channel programmable receiver and the programmable channel transmitter employ frequency modulation.

6. The computer system of claim 1 wherein the channel programmable receiver and the programmable channel transmitter employ amplitude modulation.

7. A computer system for communicating information content to a remote station, the computer system comprising:
   a digital processing section including:
      an information processor;
      a memory coupled to the information processor; and
      an information content source, coupled to the information processor, for supplying information content; and
   an RF processing section, coupled to the digital processing section, including:
      a channel programmable receiver for receiving a plurality of radio frequency channels and testing the plurality of radio frequency channels to find an unused channel;
      a channel programmable transmitter for transmitting the information content on the unused channel; and
      a controller for enabling the digital processing section to reset the transmitter and receiver and for setting transmitting and receiving operating frequencies.

8. The computer system of claim 7 wherein the RF processing section is configured as a standalone unit with respect to the digital processing section.

9. The computer system of claim 7 wherein the digital processing section and the RF processing section share a common chassis.

10. The computer system of claim 7 wherein the channel programmable receiver and the channel programmable transmitter employ frequency modulation.

11. The computer system of claim 7 wherein the channel programmable receiver and the programmable channel transmitter employ amplitude modulation.

12. A computer system for communicating information content to a remote station, the computer system comprising:
   an information processor;
   a memory coupled to the information processor;
   an information content source, coupled to the information processor, for supplying information content;
   a channel programmable receiver, coupled to the information processor, for receiving a plurality of radio frequency channels;
   testing means, coupled to the receiver, for testing the plurality of radio frequency channels to find an unused channel;
   a channel programmable transmitter, coupled to the information content source, for transmitting the information content on the unused channel; and
   means for resetting the transmitter and receiver and for setting transmitting and receiving operating frequencies.

13. The computer system of claim 12 wherein the channel programmable receiver and the programmable channel receiver employ frequency modulation.

14. The computer system of claim 12 wherein the channel programmable receiver and the programmable channel transmitter employ amplitude modulation.

15. A method of communicating an information content signal from a computer system to a remote station comprising:
   programming a receiver to receive a plurality of candidate frequency channels;

testing the candidate frequency channels until an unused candidate frequency channel is found;

programming a transmitter to transmit on the unused candidate frequency channel found in the testing step;

transmitting the information content from the computer system on the unused candidate frequency channel;

resetting the transmitter and receiver; and setting transmitting and receiving operating frequencies.

16. The method of claim 15, further comprising receiving the information content signal by the remote station.

17. A method of communicating an information content signal from a computer system to a remote station wherein the computer system includes a digital processing section and a RF processing section, the method comprising:

the digital processing section instructing the RF processing section to receive a candidate frequency channel;

the RF processing section receiving the candidate radio frequency channel the RF processing section providing a channel availability signal to the digital processing section;

the digital processing section continuing to instruct the RF processing section to receive different candidate frequency channels until an unused candidate frequency channel is found as indicated by the channel availability signal; and the RF processing section including:

a control means for enabling the digital processing section to reset the transmitter and receiver and for setting transmitting and receiving operating frequencies.

18. The method of claim 17 further comprising the digital processing section instructing the RF processing section to transmit the information content signal on the unused candidate frequency channel indicated by the channel availability signal.

* * * * *